United States Patent
Wachi (10) Patent No.: US 7,632,449 B2
(45) Date of Patent: Dec. 15, 2009

(54) METHOD OF MANUFACTURING A GOLF BALL

(75) Inventor: Toshiro Wachi, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 84 days.

(21) Appl. No.: 11/806,761

(22) Filed: Jun. 4, 2007

(65) Prior Publication Data

US 2008/0296802 A1  Dec. 4, 2008

(51) Int. Cl.
*B29B 7/00* (2006.01)
(52) U.S. Cl. .................. 264/328.7; 264/254; 264/328.8
(58) Field of Classification Search .............. 264/328.7, 264/254, 328.8
See application file for complete search history.

(56) References Cited

U.S. PATENT DOCUMENTS 3,671,621 A * 6/1972 Fukuoka et al. ............. 264/244
4,548,773 A * 10/1985 Suh et al. ................... 264/40.6
4,698,001 A * 10/1987 Vismara ...................... 425/4 R
6,089,847 A * 7/2000 Inoue et al. ................. 425/116
6,641,771 B1 * 11/2003 Sano et al. .................. 264/278
2001/0008320 A1 * 7/2001 Scolamiero ................. 264/250
2001/0026027 A1 * 10/2001 Nesbitt ....................... 264/40.1
2003/0100382 A1 * 5/2003 Bissonnette et al. ......... 473/351
2004/0261846 A1 * 12/2004 Matsuo et al. ............... 137/202
2005/0261084 A1 * 11/2005 Sullivan et al. ............. 473/354
2006/0068931 A1 * 3/2006 Aoyama et al. ............. 473/324

FOREIGN PATENT DOCUMENTS

JP 51-118535 10/1976
JP 8-322966 A 12/1996

* cited by examiner

*Primary Examiner*—Joseph S. Del Sole
*Assistant Examiner*—Jeremiah Smith
(74) *Attorney, Agent, or Firm*—Sughrue Mion, PLLC (57) ABSTRACT

A method of manufacturing a golf ball having a core or a sphere composed of a core over which at least a first covering layer and a second covering layer are consecutively formed using at least two vertically separating two-part molds of differing size cavities, each mold being composed of a top half and a bottom half, that are installed in such a way that the top mold halves are horizontally rotatable together and the bottom mold halves are horizontally rotatable together.

5 Claims, 5 Drawing Sheets

METHOD OF MANUFACTURING A GOLF BALL

BACKGROUND OF THE INVENTION

The present invention relates to a method of manufacturing a golf ball having an inner sphere composed of a core and one or more envelope layer enclosing the core, and having a cover which encloses the inner sphere. More specifically, the invention relates to a method of manufacturing a golf ball which includes injection molding the inner sphere, then, without completely releasing the spherical material from the mold, successively molding the cover.

Generally, to mold a golf ball core, unvulcanized rubber is formed into a slug of a fixed weight by way of an extrusion step. The slug is then inserted into a vulcanizing mold, where it is subjected to vulcanization under pressure, thereby giving a core made of a rubber material in the form of a sphere. To produce via pressure vulcanization a rubber sphere of two or more layers, an envelope layer-enclosed rubber sphere can be obtained by injection-molding one envelope layer about the core while holding the core with pins or the like, then cooling and demolding. If two or more envelope layers are to be formed, the above process may be repeated to form a plurality of envelope layers.

The following method is generally used to subsequently render the above rubber sphere into a golf ball. That is, the core or the inner layer of rubber enclosed by an envelope layer described above is set within a mold having dimple-forming features. A cover material is then injection-molded over the envelope layer while the envelope layer is held by support pins or the like. After cooling, the molded body is removed from the mold, then stamped and clear-coated.

In the manufacturing method described above, because the sphere is supported inside the mold cavity with support pins, sphere eccentricity tends to arise. To address this problem, JP-A 51-118535 and JP-A 8-322966 describe methods which involve forming the cover on the surface of the sphere one hemisphere at a time, and thus do not require support pins.

However, in these prior-art golf ball manufacturing methods, forming two or more cover layers over a core or an inner layer of rubber enclosed by an envelope layer requires the use of two or more different molds having cavities that correspond to the cover layer thicknesses. As a result, when the molded sphere is transferred from one mold to another mold and a cover material is injection-molded thereon, dust and debris tend to adhere to the surface of the sphere, sometimes resulting in a loss in the strength of the bond between the surface of the sphere and the overlying cover.

Also, the complete formation of two or more cover layers requires, in the formation process, that hemispherical sections be formed for each cover layer, which increases the number of operations. Moreover, because the component sections are separately fabricated, the adherence of dust and debris weakens the strength of bonded areas therebetween.

SUMMARY OF THE INVENTION

It is therefore an object of the present invention to provide a golf ball manufacturing method which is capable of consecutively enclosing a core or sphere within two or more covering layers so as to obtain a high-quality golf ball having an excellent durability and other properties.

Accordingly, the invention provides the following method of manufacturing golf balls.

[1] A method of manufacturing a golf ball having a core or a sphere composed of a core enclosed by an envelope layer over which core or sphere at least a first covering layer and a second covering layer are consecutively formed using at least two vertically separating two-part molds of differing size cavities, each mold being composed of a top half and a bottom half, that are installed in such a way that the top mold halves are horizontally rotatable together and the bottom mold halves are horizontally rotatable together, which method includes the steps of: (1) placing the core or sphere in the cavities of a first top mold half and a first bottom mold half and injection-molding a molding material so as to form the first covering layer over the core or sphere one hemisphere at a time; and (2) rotating a second top mold half or second bottom mold half having a cavity that is larger than the cavity of the first top mold half or first bottom mold half to a predetermined position, placing the core or sphere on which has been formed the first covering layer in the second top mold half or second bottom mold half, and injection-molding a molding material so as to form the second covering layer around the first covering layer one hemisphere at a time.

[2] The golf ball manufacturing method of (1) above wherein the core which is placed in the first top mold half and first bottom mold half cavities has surface regions at and near positions where mold sprues are disposed when injection-molding the molding material for the first covering layer that are about 0.1 to about 0.5 mm thicker than other surface regions on the core.

[3] The golf ball manufacturing method of (1) above wherein, during mold release of a spherical molded body from the top and bottom half sides of a mold after the molding material has been injection-molded, a pin and/or air blower presses against the hemisphere within the mold half on the side where injection molding has not been carried out so as to effect mold release therefrom while the spherical molded body is held within the mold half on the side where injection molding has been carried out.

That is, the golf ball manufacturing method of the invention uses at least two vertically separating two-part molds of differing size cavities whose top halves are horizontally rotatable together and whose bottom halves are horizontally rotatable together to consecutively form at least a first covering layer and a second covering layer over a core or a sphere composed of a core enclosed by an envelope layer. First, the core or sphere is placed in the cavities of a first top mold half and a first bottom mold half, and a molding material is injection-molded so as to form the first covering layer over the core or sphere one hemisphere at a time (Step 1). Next, a second top mold half or second bottom mold half having a cavity that is larger than the cavity of the first top mold half or the first bottom mold half is rotated to a predetermined position, the core or sphere on which the first covering layer was formed in Step 1 is placed in the second top mold half or the second bottom mold half, and a molding material is injection-molded so as to form the second covering layer around the first covering layer one hemisphere at a time (Step 2). By including above Steps (1) and (2) in the manufacturing method of the invention, the cover layers (i.e., the first covering layer and the second cover layer) may be consecutively molded one hemisphere at a time. When two cover layers are to be molded, it is possible in this way to avoid having to go to the trouble of transferring the core or sphere from one mold to another mold before injection-molding thereon a cover material. Moreover, no loss in the strength of bonded areas between the surface of the sphere and the cover occurs due to the adherence of dust or debris to the sphere surface, thus enabling the golf ball to have an improved durability compared with golf balls manufactured by conventional molding methods.

BRIEF DESCRIPTION OF THE DIAGRAMS

DETAILED DESCRIPTION OF THE INVENTION

The invention is described in detail below in conjunction with the accompanying diagrams.

Figure 1:
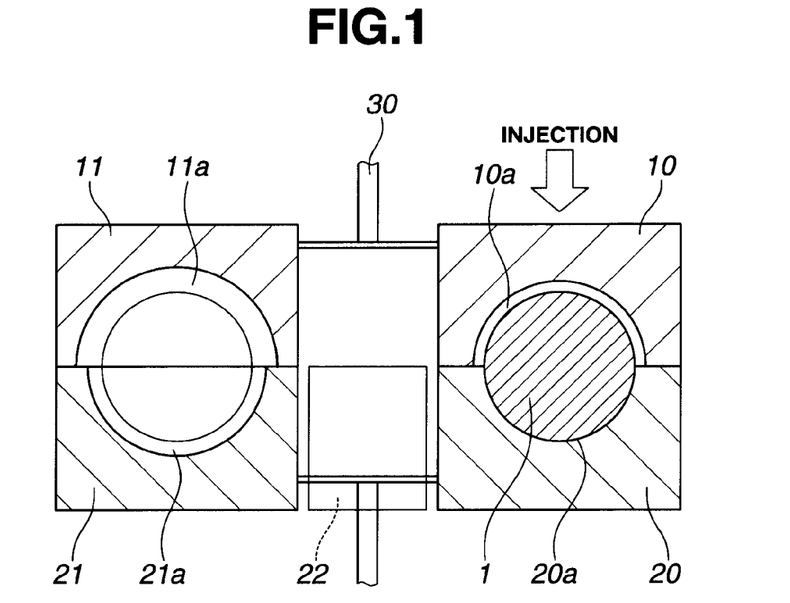
FIG. 1 is a schematic cross-sectional view of a golf ball manufacturing method according to one embodiment of the invention, showing the arrangement of molds used when a molding material for a hemispherical first covering layer (top side) is injection-molded over a golf ball core.

FIGS. 1 to 7 illustrate a golf ball manufacturing method according to one embodiment of the invention. As shown in FIG. 1, the method uses a first mold which is a combination of a first top mold half 10 and a first bottom mold half 20, and a second mold which is a combination of a second top mold half 11 and a second bottom mold half 21. These molds are installed in such a way that the mold halves are vertically separating and horizontally rotatable, with the top halves rotatable together and the bottom halves rotatable together. The first top mold half 10 has a hemispherical cavity 10a of a given size, and the first bottom mold half 20 has a hemispherical cavity 20a which matches the core 1. The second top mold half 11 has a hemispherical cavity 11a which is larger by a given amount than the hemispherical cavity 10a of the first top mold half 10. The second bottom mold half 21 has a hemispherical cavity 21a of the same diameter as the hemispherical cavity 10a of the first top mold half 10. Moreover, as indicated by the dashed line in FIG. 1, a third bottom mold half 22 having a hemispherical cavity 22a of the same diameter as the cavity 11a of the second top mold half 11 is provided so as to be rotatable in conjunction with the other bottom mold halves 20 and 21.

The material making up the molds proper is not subject to any particular limitation. For example, suitable use may be made of carbon steel, beryllium copper, aluminum alloy, tungsten heavy alloy, nickel-molybdenum steel, chromium-molybdenum steel, stainless steel, or ceramic.

The molds used in the invention are characterized by having two or more sets of cavities of differing size. The shapes of the cavities, while not subject to any particular limitation, are suitably selected in accordance with the shape of the core or the sphere composed of the core enclosed by one or more covering layer. For example, a cavity which matches the diameter of the core will have a diameter of preferably from 20 to 42.5 mm, more preferably from 25 to 42 mm, and even more preferably from 35 to 40 mm. A cavity used in the production of a sphere composed of the core enclosed by one or more covering layer is set to a diameter which is preferably from 0.2 to 4.0 mm larger, more preferably from 0.5 to 3.0 mm larger, and even more preferably from 0.6 to 1.0 mm larger, than the cavity of the core or the sphere.

In the mold combinations appearing on the right side in FIGS. 1 to 7, injection molding is carried out through injection gates within the cavities. Although details are not shown in the diagrams, use may be made of a system of gates, runners and sprues such as is commonly employed in molds.

It is preferable for the mold used to produce the final sphere obtained to have dimple-forming protrusions therein. The mold is preferably formed in such a way as to have dimples located on the parting line.

In the present invention, when a particular set of mold halves is used to carry out injection molding through an injection gate within a cavity, the molding material is injected into one mold half at a time; that is, either the top mold half or the bottom mold half. Generally, the mold half in which injection does not occur is cooled more than the mold half in which injection has just taken place. As a result, because the volume of the hemisphere held by the hemispherical cavity of the former mold half decreases from solidification, the releasability from this mold half increases. Therefore, in the practice of the invention, the spherical molded body is always held by the mold on the side where injection molding has just occurred. Moreover, in the invention, at the time of mold release, by using a pin or air blower to push against the hemisphere within the mold half on the side where injection molding has not occurred, this mold half may be induced to separate from the mold half on the side where injection molding has just occurred, enabling the spherical molded body to be reliably held by the mold half on the injection molding side.

Gas venting may be carried out by utilizing gaps between pins positioned in the mold half used in the invention and the inner peripheral face of openings for the pins.

The golf ball manufacturing method of the invention, by additionally combining mold halves having even larger cavities than the above-described mold cavities, is capable of forming a plurality of covering layers of differing thicknesses.

The manufacturing method of the invention is described below while referring to FIGS. 1 to 7. In the invention, two top mold halves (indicated by reference symbols 10 and 11) and three bottom mold halves (indicated by reference symbols 20, 21, 22) are consecutively arranged, a core or sphere is loaded into a cavity of a predetermined size, and a first covering layer and a second covering layer are consecutively injection-molded. It is preferable to load the core or sphere in an orientation that protects against molding irregularities.

Figure 2:
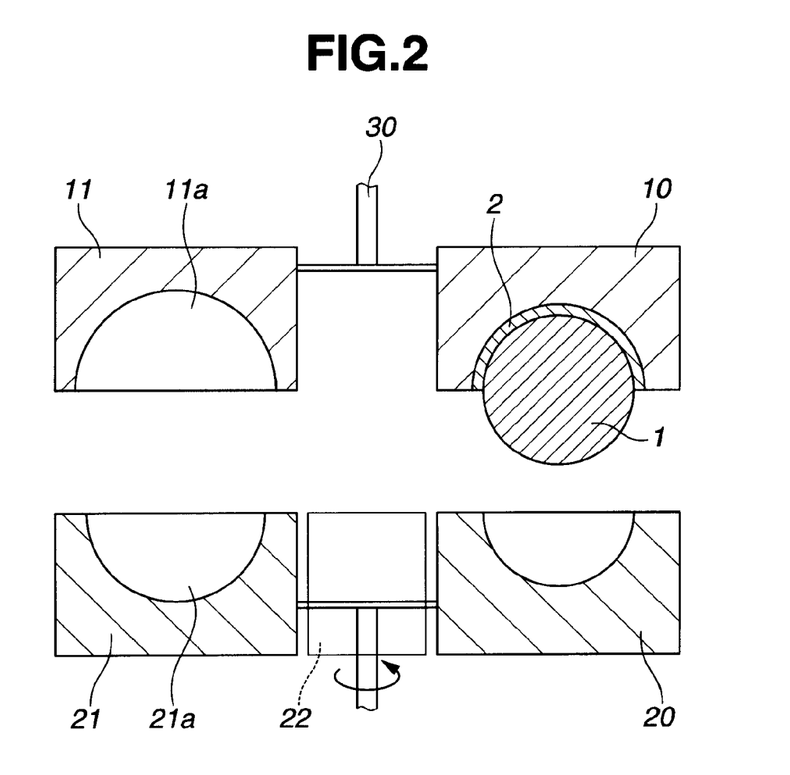
FIG. 2 is a schematic cross-sectional view of the golf ball manufacturing method of the same embodiment, showing the mold halves in a vertically separated state after the core has been covered with the hemispherical first covering layer (top side).

First, as shown in FIG. 1, a molding material is injection-molded into the gap between the core or sphere 1 (collectively referred to below simply as the "sphere 1") and the cavity 10a of the first top mold half 10 while the sphere 1 is held by the shape of the cavity 20a in the first bottom mold half 20. When injection molding is complete, as shown in FIG. 2, the first top mold half 10 and the first bottom mold half 20 are separated, with the sphere 1 on which a hemispherical first covering layer 2 has been formed being held by the first top mold half 10. It is desirable here for the mold releasability with respect to the material making up the first top mold half 10 to be lower (i.e., mold release is more difficult) than the mold releasability with respect to the material making up the first bottom mold half 20.

Figure 3:
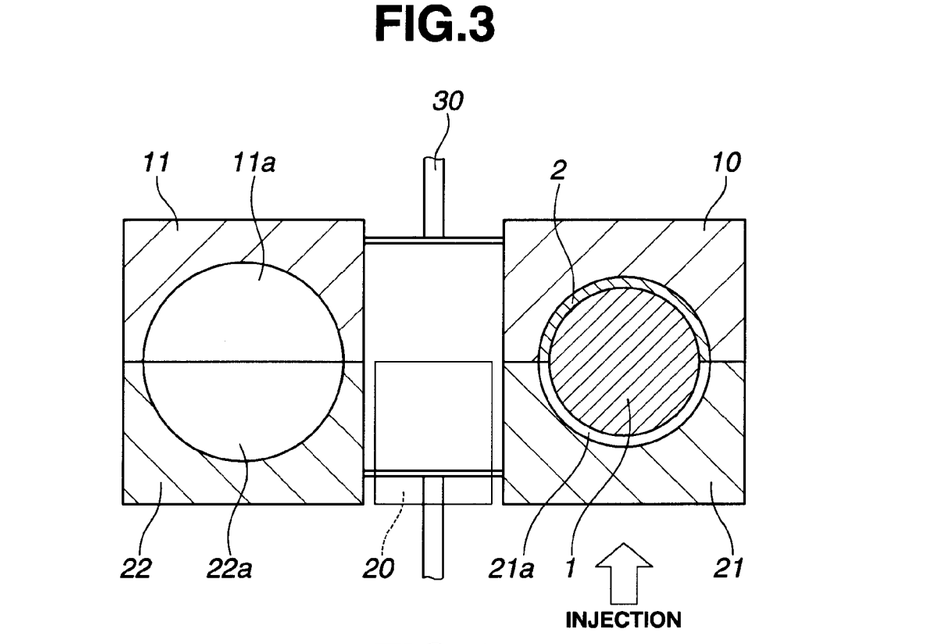
FIG. 3 is a schematic cross-sectional view of the golf ball manufacturing method of the same embodiment, showing the arrangement of molds used when the molding material for the hemispherical first covering layer (bottom side) is injection-molded over the core.

Next, the second bottom mold half 21 and the first bottom mold half 20 to which it is coupled are rotated horizontally through a predetermined angle by a rotary shaft 30 in the manner shown in FIG. 2, and the second bottom mold half 21 which matches the first top mold half 10 is positioned below the first top mold half 10 which holds the sphere 1. That is, the cavity 21a within the second bottom mold half 21 has the same diameter as the cavity 10a within the first top mold half 10. Then, as shown in FIG. 3, the first top mold half 10 and the second bottom mold half 21 are joined together and the molding material is injection-molded into the cavity 21a of the second bottom mold half 21. The molding material fills the hemispherical cavity 21a of the second bottom mold half 21 in the same manner as in the first top mold half 10, thereby forming a spherical first covering layer 2 of a given thickness over the sphere 1.

Figure 4:
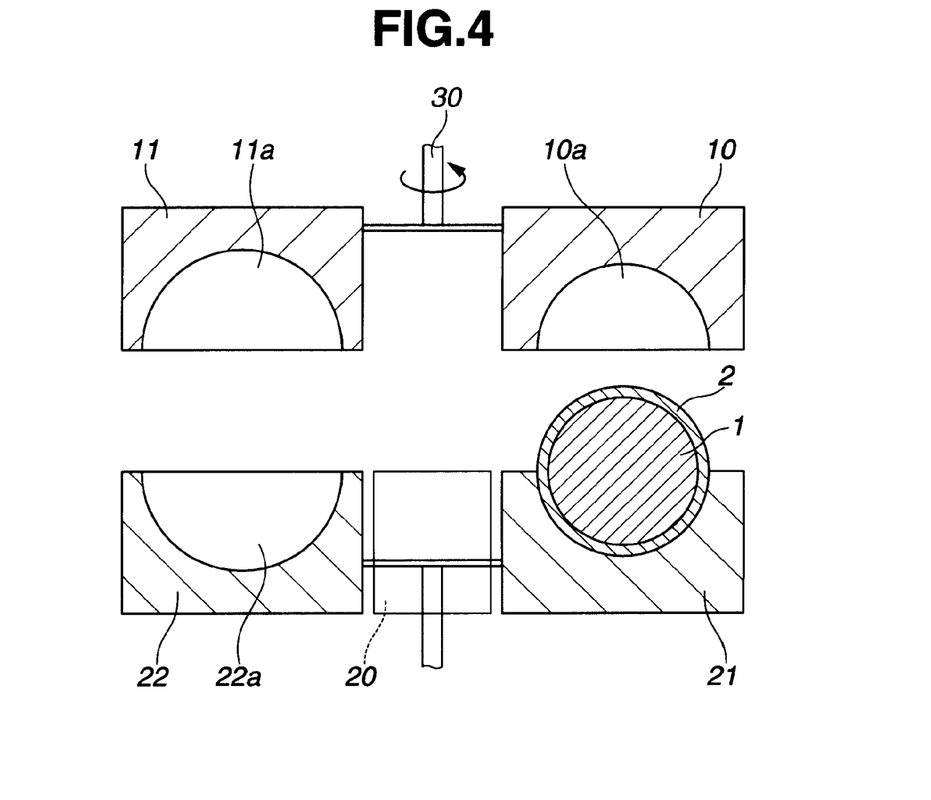
FIG. 4 is a schematic cross-sectional view of the golf ball manufacturing method of the same embodiment, showing the mold halves in a vertically separated state after the core has been completely enclosed by the first covering layer.

When injection molding is complete, as shown in FIG. 4, the first top mold half 10 and the second bottom mold half 21 are separated with the sphere 1 on which a hemispherical first covering layer 2 has just been formed remaining held by the second bottom mold half 21. It is desirable here for the mold releasability with respect to the material making up the top mold half 10 to be higher (i.e., easier mold release) than the mold releasability with respect to the material making up the second bottom mold half 21.

Figure 5:
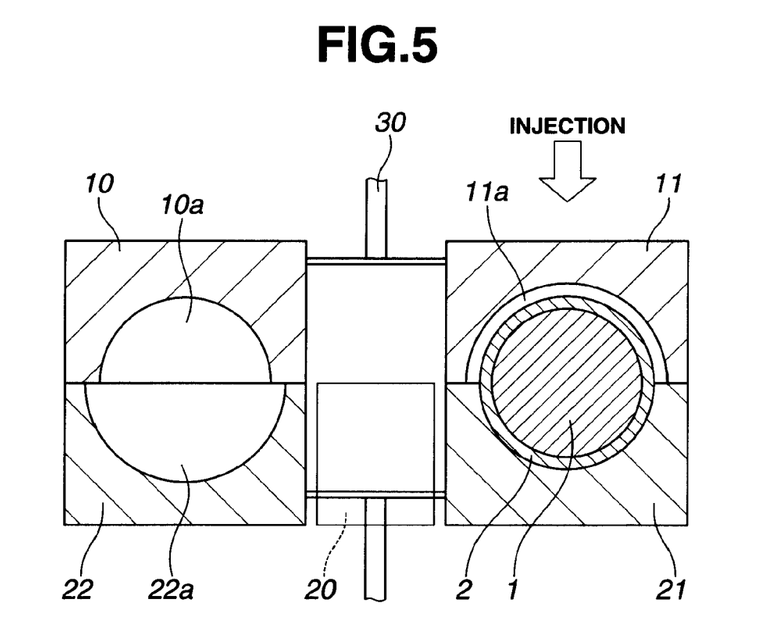
FIG. 5 is a schematic cross-sectional view of the golf ball manufacturing method of the same embodiment, showing the arrangement of molds used when a molding material for a hemispherical second covering layer (top side) is injection-molded over a sphere composed of the core enclosed by the first covering layer.

Next, the first top mold half 10 and the second top mold half 11 to which it is coupled are rotated horizontally through a predetermined angle by the rotary shaft 30 in the manner shown in FIG. 4, and the second top mold half 11 having a cavity 11a which is larger than the cavity 10a of the first top mold half 10 is placed on top of the second bottom mold half 21 which holds the sphere 1 covered by the first covering layer 2. Then, as shown in FIG. 5, by joining together the second top mold half 11 and the second bottom mold half 21 and holding the sphere 1 within the cavity 11a, a hemispherical second covering layer 3 of a given thickness may be formed by filling the gap between the cavity 11a and the sphere 1 with a molding material.

Figure 6:
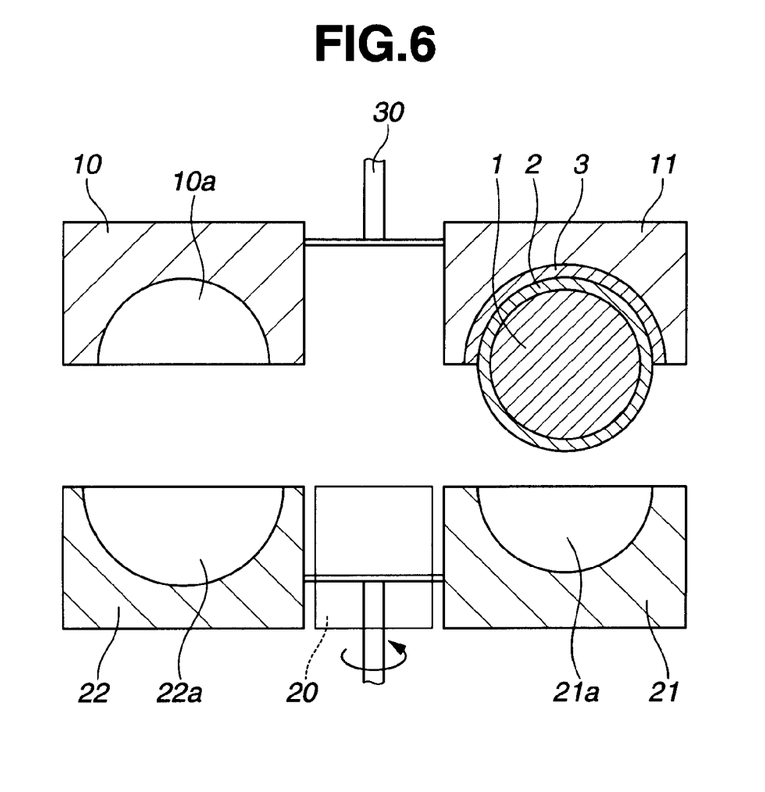
FIG. 6 is a schematic cross-sectional view of the golf ball manufacturing method of the same embodiment, showing the mold halves in a vertically separated state after the sphere composed of the core enclosed by the first covering layer has been covered with the hemispherical second covering layer (top side).

Moreover, when injection molding is complete, as shown in FIG. 6, the second top mold half 11 and the second bottom mold half 21 are separated with the sphere 1 on which a hemispherical second covering layer 3 has been formed remaining held by the second top mold half 11. It is desirable here for the mold releasability with respect to the material making up the second top mold half 11 to be lower (i.e., mold release is more difficult) than the mold releasability with respect to the material making up the second bottom mold half 21.

Figure 7:
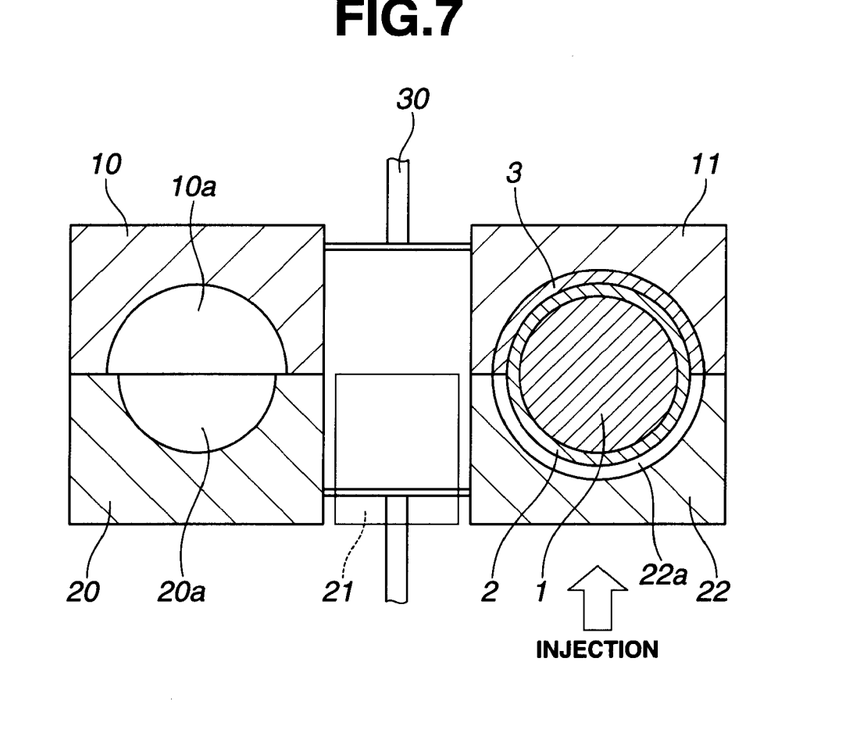
FIG. 7 is a schematic cross-sectional view of the golf ball manufacturing method of the same embodiment, showing the arrangement of molds used when the molding material for the hemispherical second covering layer (bottom side) is injection-molded over the sphere composed of the core enclosed by the first covering layer.

Next, the second bottom mold half 21 and a third bottom mold half 22 to which it is coupled are rotated horizontally through a predetermined angle by a rotary shaft 30 in the manner shown in FIG. 6, and the third bottom mold half 22 which matches the second top mold half 11 is positioned below the second top mold half 11 which holds the sphere 1 covered by the second covering layer 3. That is, the cavity 22a within the third bottom mold half 22 has the same diameter as the cavity 11a of the second top mold half 11. Then, as shown in FIG. 7, the second top mold half 11 and the third bottom mold half 22 are joined together, and the molding material is injection-molded into the cavity 22a in the third bottom mold half 22. The molding material fills the gap between the hemispherical cavity 22a of the third bottom mold half 22 and the sphere 1 enclosed by the first covering layer 2 in the same manner as in the second top mold half 11, thus making it possible to additionally enclose the sphere 1 covered by the first covering layer 2 with a spherical second covering layer 3 of a given thickness.

By consecutively forming in this way two or more covering layers of differing thicknesses (e.g., a first covering layer and a second covering layer) one hemisphere at a time according to the golf ball manufacturing method of the invention, there is no need for support pins and the like to support the core or sphere in the mold, enabling a golf ball of a high sphericity to be obtained. Moreover, in the inventive manufacturing method, because the cover material is not injection-molded after transferring the core or sphere from one mold to another mold, undesirable effects such as a weakening in the strength of bonded areas between the surface of the sphere and the cover due to the adherence of dust and debris to the sphere surface do not arise, thus making it possible to manufacture golf balls of high quality which are endowed in particular with an excellent durability to cracking.

Figure 8:
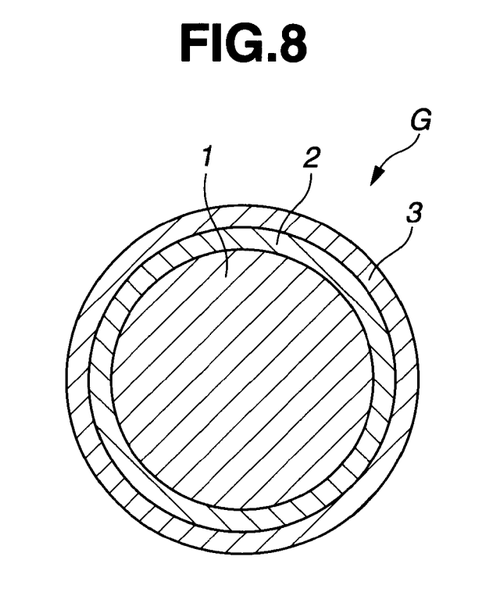
FIG. 8 is a schematic cross-sectional view of the multilayer golf ball obtained by the manufacturing method of the same embodiment.

The golf ball manufactured by way of the steps illustrated in FIGS. 1 to 7 has, as shown in FIG. 8, a construction of at least three layers which includes a first cover layer 2 and a second covering layer 3 that have been successively formed over a core or sphere 1.

In the practice of the invention, the material used in the core is not subject to any particular limitation and may be any core material ordinarily used in golf balls. A polybutadiene having a cis-1,4 bond content of preferably at least 40%, more preferably at least 60%, and even more preferably at least 90%, is especially desirable. The polybutadiene is preferably a polybutadiene synthesized using a rare-earth catalyst, and most preferably a polybutadiene synthesized using a neodymium catalyst. It is also preferable to use a modified polybutadiene rubber obtained by subsequent reaction with a terminal modifier. The foregoing rubber component may be a polybutadiene having a cis-1,4 bond content of at least 60% and a 1,2-vinyl bond content of not more than 2%. A core formed using the above material has good rebound properties and enables the golf ball productivity to be enhanced.

In the above core, air pockets and areas where the hardness has deteriorated sometimes form at the mold parting plane or when the core is molded and vulcanized from a slug. Because there is a tendency for the strength in such areas of the core to weaken due to irregularities during molding, these areas may be situated at the top of the hemispherical cavity. Alternatively, the strength may be reinforced by surrounding the core with a single envelope layer.

The first and second covering layers are exemplified by various types of envelope layers, intermediate layers and outermost cover layers for enclosing the core. The materials used in these layers are not subject to any particular limitation, and may generally be any of various types of resin materials. Especially preferred materials include those composed primarily of thermoplastic resins or thermoplastic elastomers which contains short organic fibers. Such thermoplastic resins or thermoplastic elastomers are exemplified by ionomer resins, thermoplastic polyester elastomers, olefin-unsaturated carboxylic acid copolymers, olefin-unsaturated carboxylic acid-unsaturated carboxylic acid ester copolymers, and metal ion neutralization products of such copolymers. The short organic fibers may be suitably selected from among, for example, binary copolymers composed of a polyolefin component and a polyamide component, and binary copolymers composed of a polyolefin component and a polyamide component in the form of nylon fibers.

The molding temperature for the above resin material, while not subject to any particular limitation, is preferably set to from 130 to 200° C., more preferably from 140 to 160° C., and even more preferably from 145 to 155° C.

Although not shown in the diagrams, the gates for injecting the above-described covering materials may be suitably selected according to the material itself and the injection pressure, although the gate diameter is preferably from 0.2 to 2.0 mm, more preferably from 0.4 to 1.0 mm, and even more preferably from 0.8 to 1.0 mm. The number of gates per half mold is preferably at least two, more preferably at least three, and even more preferably at least five. Of the two or more gates, the number of gates for injection-molding the resin material is preferably at least one, more preferably at least two, even more preferably at least three, and most preferably at least four.

No particular limitation is imposed on the positions of the injection gates. In the invention, because the top mold halves and the bottom mold halves are each separating and the molding materials are consecutively injection-molded while the mold halves rotate horizontally, it is preferable, for example, to position the injection gates vertically on the cavity walls, in the manner of the injection gate 50 in FIG. 9.

In molds for molding a cover from a molding material, it is useful to provide dimple-forming projections beforehand in the mold cavity. It is also possible to suitably use seamless ball-forming molds having such projections at the mold parting plane.

Figure 9A:
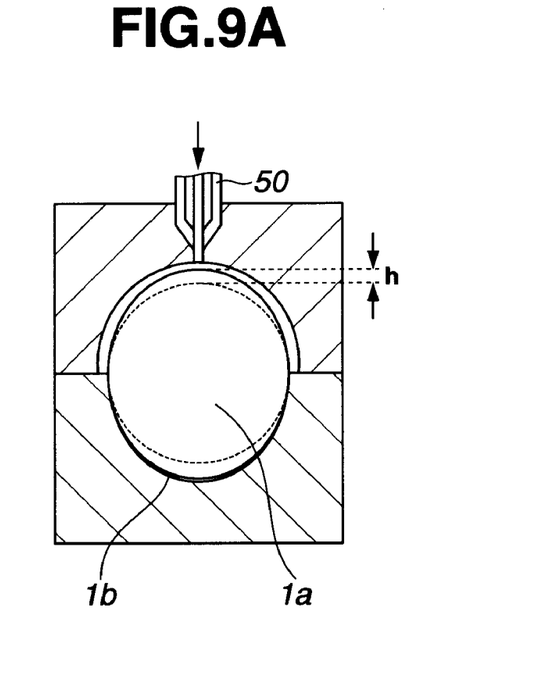
FIG. 9 shows schematic cross-sectional views illustrating a spheroidal core placed inside a mold cavity, and the manner in which a cover material has been injection-molded about the core.
Figure 9B:
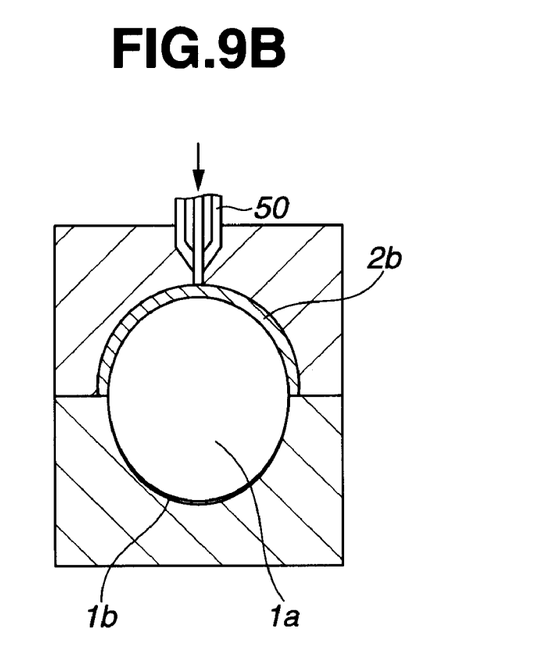

The core used in the invention is not subject to any particular limitation. However, it is preferable to use as the core a spheroidal molded body which is somewhat thicker near the injection gates when the cover materials are molded. Even if a truly spherical core is used, in the cover material injection-molding operations, the core near the injection gates will deform slightly due to such factors as the cover material injection pressure, as a result of which the sphericity of the core will be lost. To have the core after the cover material has been molded be truly spherical, it is desirable to use an eccentric core having a shape that takes into account core deformation due to the injection pressure when the cover material is injected from the injection gates into the mold cavity. Specifically, as shown in FIG. 9A, a spheroidal core 1a having a portion which corresponds to where the sprues are situated in the mold (top mold half) and has a thickness h in a range of 0.1 to 0.5 mm is pre-molded, and is held in the cavity of the bottom mold half. When the cover material is then injected from the injection gate 50, the spheroidal core 1a deforms under the injection pressure, enabling the side enclosed by a cover 2b as shown in FIG. 9B to be made truly spherical. In this case, the cavity of the bottom mold half has a spheroidal shape which matches the spheroidal shape of the core 2a, thereby enabling the spheroidal core 1a to be securely held by the cavity of the lower mold half. Although not shown in the diagram, when a similar operation is carried out for the bottom mold half as well, it is possible to ultimately obtain a truly spherical core (the dotted line portion indicates a true circle).

By thus injection molding the cover so as to make the cover thickness uniform, the core enclosed by the cover can be maintained as a true sphere, which improves the symmetry of the ball as a whole. This in turn ensures a good uniformity of flight, and also makes it possible to improve the durability of the ball to impact.

In the present invention, the manufacture of golf balls is not limited to the molds shown in FIG. 1 to 7. Suitable modifications in the mold construction are possible insofar as they do not depart from the scope of the invention.

As described above, the inventive method of manufacturing golf ball, by forming covering layers one hemisphere at a time, enables two or more covering layers of differing thicknesses to be consecutively formed. The golf balls obtained by this manufacturing method are of a higher quality than golf balls obtained by conventional manufacturing methods. In particular, the durability of the golf ball can be enhanced.

EXAMPLES

The following Examples of the invention and Comparative Examples illustrate but do not limit the invention.

Example 1 and Comparative Example 1

Cores were produced by formulating a rubber composition in the proportions shown in Table 1 (parts by weight), and vulcanizing the composition at 150° C. for 15 minutes. In both the example of the invention and the comparative example, use was made of a spheroidal core which, as shown in FIG. 9, was thicker near the injection gates for the cover. A thermoplastic polyester elastomer (available from DuPont-Toray Co., Ltd. under the trade name "Hytrel 4047") was injection-molded as the molding material onto the core to a thickness of 1.7 mm so as to form a first covering layer (envelope layer). An ionomer resin mixture (available from DuPont-Mitsui Polychemicals Co., Ltd. under the trade names "Himilan 1706" and "Himilan 1605"; weight ratio, 50/50) was then used to form a second covering layer (outermost cover) over the envelope layer. Using this cover material, a cover layer having a thickness of 2.0 mm was injection-molded over the sphere composed of the core enclosed by the envelope layer. In addition, 432 dimples were molded onto the surface of the outermost cover at the same time that the latter cover material was injection molded.

Injection molding of the first covering layer (envelope layer) and the second covering layer (outermost cover) in Example 1 and Comparative Example 1 is described below.

Example 1

Using the above-described golf ball molds of FIGS. 1 to 7, a first covering layer and a second covering layer were created by methods similar to those described in conjunction with FIGS. 1 to 7.

Comparative Example 1

A first covering layer and a second covering layer were created by a method similar to the prior art. That is, a core was set in the cavities of a pair of mold halves and, with the core supported by a given number of support pins, a thermoplastic polyester elastomer was injected into the mold cavity so as to form a spherical first covering layer around the core. The sphere obtained by forming the first covering layer was then set in another mold and, with the sphere supported by a given number of support pins, an ionomer was injected into the mold cavity so as to form a spherical second covering layer over the first covering layer.

TABLE 1

| (parts by weight) | Example/Comparative Example |
|---|---|
| 1,4-cis-Polybutadiene | 100 |
| Zinc acrylate | 25 |
| Dicumyl peroxide | 0.6 |
| Antioxidant | 0.1 |
| Zinc oxide | 30 |

Trade names for the primary materials in Table 1 are as follows.
Polybutadiene: Produced by JSR Corporation under the trade name "BR 730"
Dicumyl peroxide: Produced by NOF Corporation under the trade name "Percumyl D"
Antioxidant: Produced by Ouchi Shinko Chemical Industry Co., Ltd. under the trade name "Nocrac NS-6"

Performance evaluations for the golf balls of Example 1 and Comparative Example 1 obtained by the manufacturing methods described above are shown in Table 2 below.

TABLE 2

| | | Example 1 | Comparative Example 1 |
|---|---|---|---|
| Diameter (mm) | | 42.68 | 42.70 |
| Weight (g) | | 45.62 | 45.61 |
| Deflection (mm) | | 2.60 | 2.60 |
| Initial velocity | | 77.42 | 77.50 |
| Initial velocity (m/s) | | 65.3 | 65.3 |
| Durability | Cracking begins (shots) | 412 | 352 |
| to impact | Cracking average (shots) | 502 | 404 |

Performance Evaluation
(1) Deflection:
The deflection when compressed under a final load of 130 kgf from an initial load of 10 kgf.
(2) Initial Velocity:
The initial velocity when struck at 1,376 rpm, as measured with a USGA-type initial velocity measuring instrument.
(3) Durability on Impact:
The durability to impact of a golf ball when repeatedly struck with a driver at a head speed of 45 m/s was determined. That is, using N=10 balls as the basis for evaluation in each example, the balls were repeatedly struck with a driver at a head speed of 45 m/s and the number of shots that had been taken with the first of the ten balls to crack when cracking occurred in that ball was indicated as the "Cracking begins" value for that example. The number of shots that had been taken with each individual ball when it first cracked was averaged for all ten balls and indicated as the "Cracking average" value for that example.

The invention claimed is:

1. A method of manufacturing a golf ball having a core or a sphere composed of a core enclosed by an envelope layer over which core or sphere at least a first covering layer and a second covering layer are consecutively formed using at least two vertically separating two-part molds of differing size cavities, each mold being composed of a top half and a bottom half, that are installed in such a way that the top mold halves are horizontally rotatable together and the bottom mold halves are horizontally rotatable together, said method comprising the steps of:

(1) placing the core or sphere in the cavities of a first top mold half and a first bottom mold half and injection-molding a molding material so as to form the first covering layer over the core or sphere one hemisphere at a time; and (2) rotating a second top mold half or second bottom mold half having a cavity that is larger than the cavity of the first top mold half or first bottom mold half to a predetermined position, placing the core or sphere on which has been formed the first covering layer in the second top mold half or second bottom mold half, and injection-molding a molding material so as to form the second covering layer around the first covering layer one hemisphere at a time;

wherein the core which is placed in said first top mold half and first bottom mold half cavities has surface regions at and near positions where mold sprues are disposed when injection-molding the molding material for the first covering layer that are about 0.1 to about 0.5 mm thicker than other surface regions on the core;

the placing the core or sphere comprises placing a core having an eccentric shape prior to the molding of the cover material in the cavities of a first top mold half and a first bottom mold half; and the injection molding the molding material for forming both the first layer and second layer causes the core having an eccentric shape to deform to a core having a spherical shape after the forming the second covering layer is completed.

2. The golf ball manufacturing method of claim 1 wherein, during mold release of a spherical molded body from the top and bottom half sides of a mold after the molding material has been injection-molded, a pin and/or air blower presses against the hemisphere within the mold half on the side where injection molding has not been carried out so as to effect mold release therefrom while the spherical molded body is held within the mold half on the side where injection molding has been carried out.

3. The gold ball manufacturing method of claim 1 wherein the mold is formed such a way as to have dimples located on the parting line.

4. The golf ball manufacturing method of claim 1 wherein the core or sphere in an orientation that protects against molding irregularities is loaded.

5. The golf ball manufacturing method of claim 1 wherein the material used in the core is a polybutadiene having a cis-1,4 bond content of at least 40% which is synthesized using rare-earth catalyst.

* * * * *